US008959340B2

(12) United States Patent
Raffard et al.

(10) Patent No.: US 8,959,340 B2
(45) Date of Patent: Feb. 17, 2015

(54) METHOD FOR ACCESSING AND TRANSFERRING DATA LINKED TO AN APPLICATION INSTALLED ON A SECURITY MODULE ASSOCIATED WITH A MOBILE TERMINAL, AND ASSOCIATED SECURITY MODULE, MANAGEMENT SERVER AND SYSTEM

(75) Inventors: Rémi Raffard, Paris (FR); Houssem Assadi, Caen (FR)

(73) Assignee: Orange, Paris (FR)

( * ) Notice: Subject to any disclaimer, the term of this patent is extended or adjusted under 35 U.S.C. 154(b) by 137 days.

(21) Appl. No.: 12/935,393

(22) PCT Filed: Mar. 30, 2009

(86) PCT No.: PCT/FR2009/050522
§ 371 (c)(1),
(2), (4) Date: Sep. 29, 2010

(87) PCT Pub. No.: WO2009/125141
PCT Pub. Date: Oct. 15, 2009

(65) Prior Publication Data
US 2011/0029786 A1      Feb. 3, 2011

(30) Foreign Application Priority Data

Mar. 31, 2008  (FR) .................................... 08 52110

(51) Int. Cl.
*H04L 29/06*    (2006.01)
*H04L 9/32*     (2006.01)
*G06F 11/30*    (2006.01)
(Continued)

(52) U.S. Cl.
CPC ............. *H04L 63/10* (2013.01); *G06Q 20/3576* (2013.01); *G06Q 20/357* (2013.01); *G06Q 20/3574* (2013.01); *G06Q 20/341* (2013.01)
USPC ........... 713/167; 713/164; 713/165; 713/182; 713/185; 713/190; 726/2; 726/9; 726/20

(58) Field of Classification Search
CPC ............. G06Q 20/341; G06Q 20/3576; G06Q 20/3574; G06F 21/77; G06F 21/78
USPC ............. 726/2, 5, 9, 16, 17, 20; 713/150–167
See application file for complete search history.

(56) References Cited

U.S. PATENT DOCUMENTS 6,179,205 B1 *  1/2001  Sloan ............................. 235/382
6,233,683 B1 *  5/2001  Chan et al. ..................... 713/172
(Continued)

FOREIGN PATENT DOCUMENTS

EP       1 370 084 A1     12/2003
WO         01/08111 A1     2/2001
WO   WO 2005/022366 A1     3/2005

*Primary Examiner* — Tae Kim
(74) *Attorney, Agent, or Firm* — Drinker Biddle & Reath LLP

(57) ABSTRACT

A method is provided for transferring data linked to an application installed on a security module associated with a mobile terminal, the data being stored in a first secure memory area of the security module, suitable for receiving a request to access the data, to read the data, and to transmit or store the data after encryption. A method is also provided for accessing these data suitable for transmitting a request to access, to receive and to decrypt the encrypted data. A security module, a management server, and a system implementing the transfer and access methods are also provided.

15 Claims, 5 Drawing Sheets

(51) Int. Cl.
*G06F 21/00* (2013.01)
*G06Q 20/34* (2012.01)

(56) References Cited

U.S. PATENT DOCUMENTS

| | | | |
|---|---|---|---|
| 7,159,243 B1* | 1/2007 | Muhlberger et al. | 726/21 |
| 7,225,465 B2* | 5/2007 | Audebert et al. | 726/20 |
| 7,246,375 B1* | 7/2007 | Jean et al. | 726/21 |
| 8,001,615 B2* | 8/2011 | Ksontini et al. | 726/29 |
| 2004/0210715 A1* | 10/2004 | Harari et al. | 711/115 |
| 2005/0213763 A1* | 9/2005 | Owen et al. | 380/270 |
| 2005/0222961 A1* | 10/2005 | Staib et al. | 705/64 |
| 2005/0235141 A1* | 10/2005 | Ibrahim et al. | 713/164 |
| 2005/0289646 A1* | 12/2005 | Zimmer et al. | 726/9 |
| 2006/0107032 A1* | 5/2006 | Paaske et al. | 713/2 |
| 2006/0196931 A1* | 9/2006 | Holtmanns et al. | 235/380 |
| 2006/0289659 A1* | 12/2006 | Mizushima | 235/492 |
| 2006/0293030 A1* | 12/2006 | Cantini et al. | 455/411 |
| 2007/0221725 A1* | 9/2007 | Kawaguchi | 235/382 |

* cited by examiner

METHOD FOR ACCESSING AND TRANSFERRING DATA LINKED TO AN APPLICATION INSTALLED ON A SECURITY MODULE ASSOCIATED WITH A MOBILE TERMINAL, AND ASSOCIATED SECURITY MODULE, MANAGEMENT SERVER AND SYSTEM

CROSS-REFERENCE TO RELATED APPLICATIONS

This application is the U.S. national phase of the International Patent Application No. PCT/FR2009/050522 filed Mar. 30, 2009, which claims the benefit of French Application No. 08 52110 filed Mar. 31, 2008, the entire content of which is incorporated herein by reference.

FIELD OF THE INVENTION

The present invention relates to the field of telecommunications, and more particularly to that of the security of the applications hosted on a secure element of a mobile terminal.

BACKGROUND

Most existing mobile terminals can be used, not only to make telephone calls, but also to execute a certain number of applications downloaded into a security module linked to the terminal. This security module may be a memory module of the terminal or a removable medium (for example, a subscriber chip card) inserted into the terminal.

The downloading of these applications is performed via a conventional connection between the mobile terminal and a management server.

Such an application comprises, on the one hand, a program part which is executed upon the receipt of an instruction to select the application from an external equipment item, for example a contactless terminal, and, on the other hand, an application data area.

These application data are generated by a service provider, for example, a bank for a payment application, and transmitted via a secure channel to a management server. Following the receipt of these data, the management server orders the downloading of these data into the security module, using a set of keys shared between it and this module.

During the life of the application, a portion of these data may be updated by the application itself.

There is no means for an equipment item such as a management server for recovering these modified data in order to transfer them to another security module or to back them up when updating the application.

Thus, upon a change of security module, for example a change of SIM card following a change of operator, the user must contact the management server managing the application which once again contacts the application's service provider to obtain the application data.

With the increase in the number of mobile terminals, changes of security module are more frequent, and this process becomes difficult to manage.

Furthermore, the downloaded application data are initial data and not data updated during the life of the application.

The company SICAP (registered trademark) proposes a product making it possible to update the configuration of a SIM (Subscriber Identity Module) card. This update consists, for a remote server, in reading the configuration data in a SIM card inserted into a mobile terminal then rewriting them into another SIM card. The duly transferred data are non-sensitive data, that is to say non-confidential data, and consequently data that are not read-protected. To read such data, the server transmits a read instruction conforming to Standard ISO 7816-4. This product does not make it possible to read confidential information and therefore does not make it possible to copy the confidential application data of an application installed on a SIM card.

Moreover, upon an update of the application, for example a change of version of the application program, the application data area is reinitialized with the data transmitted once again by the service provider linked to the application.

There is therefore a need to be able to securely recover an application's application and confidential data area in order to transfer it to another security module or to reinstall it upon an update of the application, without involving a service provider.

SUMMARY

To this end, the present invention proposes a method for transferring data linked to an application installed on a security module associated with a mobile terminal, the data being stored in a first secure memory area of the security module, characterized in that it comprises:

a step for receiving a message containing a request to access said data of said application, at least a portion of said message being encrypted with a first management key, a step for obtaining said request by decrypting the message by means of a second management key associated with the first management key, a step for reading said application data, a step for encrypting the data read with the second management key, a step for storing in a second memory area of the security module or for transmitting the encrypted data.

Thus, the application data of an application installed on a security module can be recovered by a management server after said server has been authenticated by the security module. The data recovered by the server can then be transferred to another security module, without requiring access to the application's service provider.

The application's application data can also be stored temporarily in a security module memory area to enable the application to be updated. They can thus be reinstalled following this update. Thus, the updating of an application no longer involves accessing the service provider's server.

According to a particular feature of the method of the invention, the access request includes an action instruction and the method includes a step for executing said action after the transmission or storage step.

Thus, the action instruction makes it possible to specify the access request by indicating the additional actions to be performed by the security module upon an access request.

According to a particular embodiment of the invention, the action is a blocking of said application and/or a deleting of data of said application. The blocking or deleting of application data prevents one and the same instance of the application from being duplicated in a number of security modules and thus makes it possible to increase security.

According to another embodiment, the action is a request to transfer said data of the application into a second memory area of the security module. The data backed up in this way can thus be reused by the security module, for example be reinstalled following the updating of the application. The fact that data is not communicated to an equipment item external to the security module further increases security.

According to a particular embodiment, the method also includes a step for receiving an instruction to update the application in a third secure memory area and a step for receiving an instruction to transfer said data from the second memory area to the third secure memory area.

Thus, the updating of an application, for example putting in place a new version of the application program, no longer involves accessing a service provider to install the application data. Furthermore, the reinstalled application data are application data that the inventor had before the update, and not the initial application data. Thus, the updating of an application is performed transparently for the user and does not involve reconfiguring these data.

The invention also relates to a method for accessing data linked to an application installed on a security module associated with a mobile terminal, characterized in that it comprises:

a step for transmitting a message containing a request to access secure data of the security module, at least a portion of said message being encrypted with a first management key, a step for receiving said data encrypted with a second management key associated with the first key, a step for obtaining said data by decryption by means of the first key.

Thus, a management server capable of obtaining these data can transfer them to another security module without requiring access to a service provider. The data obtained can also be backed up by the management server so as to then be retransferred to the same security module, after, for example, an updating of the application linked to the data.

According to a particular feature, the access request includes an action instruction, said action being a request to block the application and/or a request to delete application data.

According to another particular feature, the method also includes a step for securely transmitting said data into a second security module.

The invention also relates to a method for requesting the transfer of data linked to an application installed on a security module associated with a mobile terminal, the data being stored in a first secure memory area of the security module, characterized in that it comprises:

a step for transmitting a message containing a request to transfer said data of said application into a second memory area of the security module, at least a portion of said message being encrypted with a first management key, a step for transmitting an update of said application into a third secure memory area, a step for transmitting a request to transfer said data from the second memory area to said third secure memory area.

Thus, the update does not involve accessing the server of the service provider and is performed transparently for the user.

The invention also relates to a security module associated with a mobile terminal, comprising means for receiving a message containing a request to access data linked to an application installed on the security module, the data being stored in a first secure memory area of the security module, said message being encrypted with a first management key, means for obtaining said request by decryption of the message by means of a second management key associated with the first management key, means for reading said data, means for encrypting the data read with the second management key, means for transmitting the encrypted data and at least one second memory area able to store the encrypted data.

The invention also relates to a management server comprising means capable of implementing an access method and/or a transfer request method as described previously.

The invention also relates to a system comprising two security modules, of which at least one module is as described previously, and at least one management server as described previously.

The invention finally relates to a computer program product comprising instructions for implementing the steps of the data transfer method as described previously when it is loaded and run by a processor of a security module.

BRIEF DESCRIPTION OF THE DRAWINGS

Other particular features and advantages of the present invention will become apparent from the following description of embodiments given by way of non-limiting example, with reference to the appended drawings, in which.

DETAILED DESCRIPTION

One embodiment of a data transfer method and of a method for accessing these data will now be described with reference to FIGS. 1 and 2.

Figure 1:
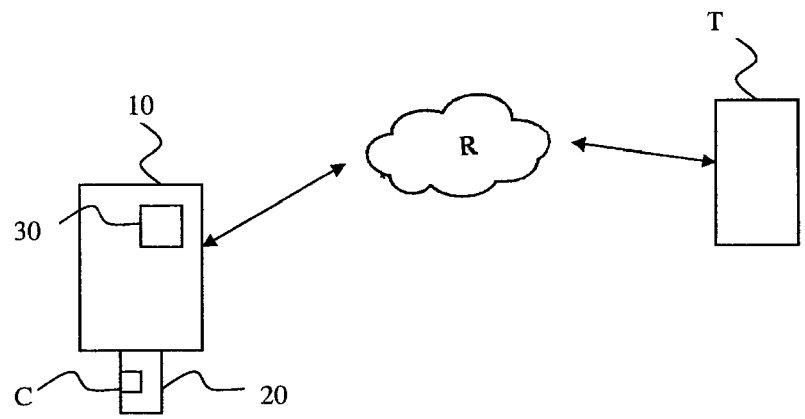
FIG. 1 is a diagram illustrating the general context of the invention.

With reference to FIG. 1, a user has a mobile terminal 10 which is, for example, a cell phone or a PDA (Personal Digital Assistant).

This mobile terminal has a communication module 30, for example a GSM module, enabling communication, via a communication network R, with remote servers, for example with a management server T. This communication is, for example, an "OTA" (Over-The-Air) communication, that is to say a conventional wireless communication. Alternatively, the mobile terminal is linked to the network R by a wired telephone line.

The mobile terminal 10 also includes a security module 20.

The security module 20 is, for example, a removable medium of SIM or UICC (Universal Integrated Circuit Card)

type, a secure memory area of the mobile terminal or a memory card hosting a secure element (SD card, Embedded Secure controller, etc.).

The module 20 contains confidential data C stored in a memory area, which is a first secure memory area. These confidential data are, for example, data that are read-protected by a key shared by the management server T and the security module 20.

Conventionally, a shared key is either one and the same key known to both entities, or a pair of associated keys. An example of associated keys is a pair of keys, one of which is secret and is known only to one entity and the other of which is public and used by the other entity.

Figure 2:
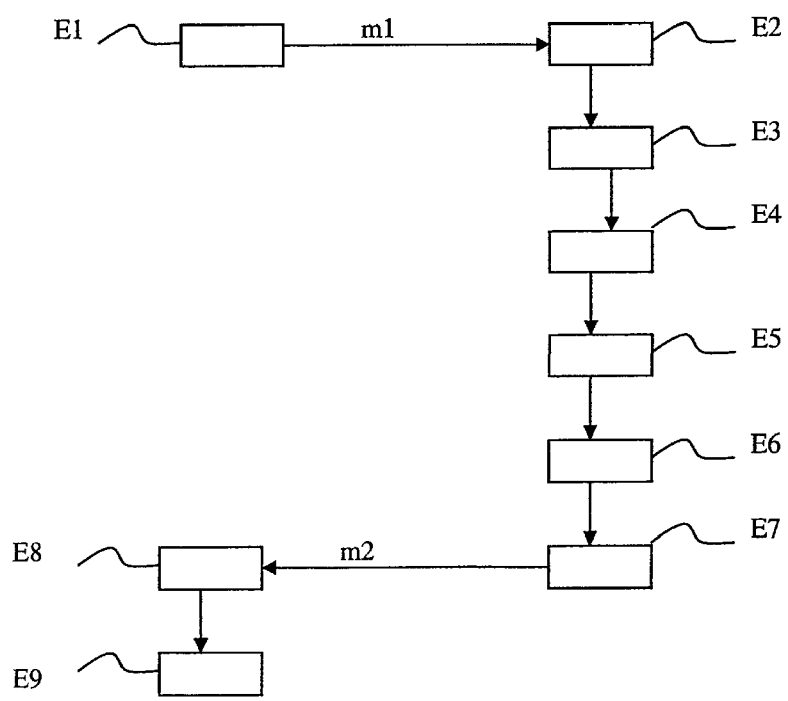
FIG. 2 is a flow diagram illustrating the various steps of an access method and a data transfer method according to the invention.

Referring to FIG. 2, the various steps of a data transfer method and a method for accessing these data according to one embodiment of the invention will now be described.

In a preliminary step (not represented), a first management key KP1 has been stored in the management server T and a second management key KS1, associated with the first management key, has been stored in the first security module 20.

In a first step E1, the management server T transmits to the security module a message m1 containing a request DA to access the confidential data C. The message m1 is encrypted by the server T with the first management key KP1.

This message is received by the security module 20 in a step E2.

In the next step E3, the security module 20 decrypts the message m1 received by using the second management key KS1 and obtains the access request DA.

In the next step E4, the security module 20 analyzes this access request DA and determines that this request is an instruction to securely read confidential data C.

The step E4 is followed by a step E5 in which the security module recovers these data C by reading the first secure memory area of the security module 20.

In the next step E6, the security module 20 encrypts the data read C using the key KS1 and transmits, in a step E7, a message m2 containing the encrypted data to the management server T, via the mobile terminal 10 and the network R.

The management server T receives the message m2 in a step E8 and, using the key KP1, decrypts the data contained in this message and thus obtains the confidential data C (step E9). The data obtained are either stored in a memory of the server T, or transferred to another security module.

Alternatively, the steps E7 to E9 are replaced by a step during which the security module 20 stores the encrypted data in a second memory area of the security module.

One particular embodiment of a data transfer method and of a method for accessing these data, in which the secure data are transferred from a first security module to a second security module, will now be described with reference to FIGS. 3 to 5.

Figure 3:
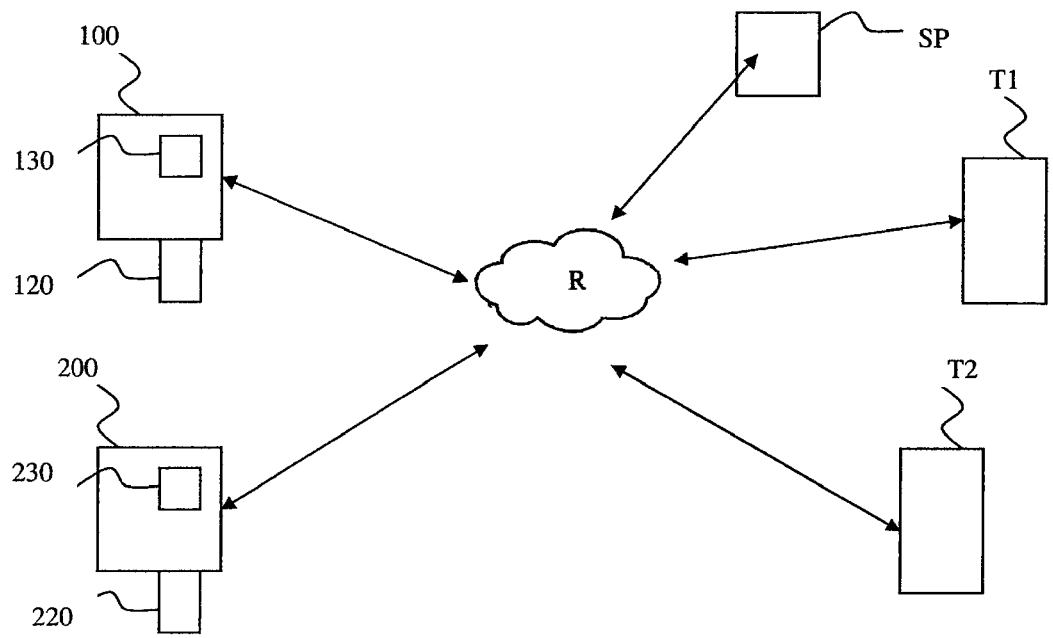
FIG. 3 is a diagram illustrating a system for transferring data from a first security module to a second security module according to one embodiment of the invention.

Referring to FIG. 3, a user has a first mobile terminal 100, which is, for example, a cell phone or a PDA (Personal Digital Assistant).

This mobile terminal has a communication module 130, for example a GSM module, enabling communication, via a communication network R, with remote servers, for example with a first management server T1. This communication is, for example, an "OTA" (Over-The-Air) communication, that is to say a conventional wireless communication.

The mobile terminal 100 also includes a first security module 120.

The first management server T1, for example a server of a service provider, is used to manage one or more applications installed on the first security module 120. This server T1 is, in particular, responsible for downloading to the first security module 120 the applications that it manages.

This user also has a second mobile terminal 200 which is, for example, a cell phone or a PDA (Personal Digital Assistant).

This mobile terminal 200 has a communication module 230, for example a GSM module, enabling communication, via the communication network R, with remote servers, for example with a second management server T2. This communication is, for example, an "OTA" (Over-The-Air) communication, that is to say a conventional wireless communication.

The mobile terminal 200 also includes a secure module 220, which is a second security module.

The second management server T2 is used to manage one or more applications installed on the second security module 220.

In this embodiment, the security modules 120 and 220 are removable memory cards compatible with the GlobalPlatform specifications (GlobalPlatform Card Specification—version 2.1.1, March 2006).

Figure 4:
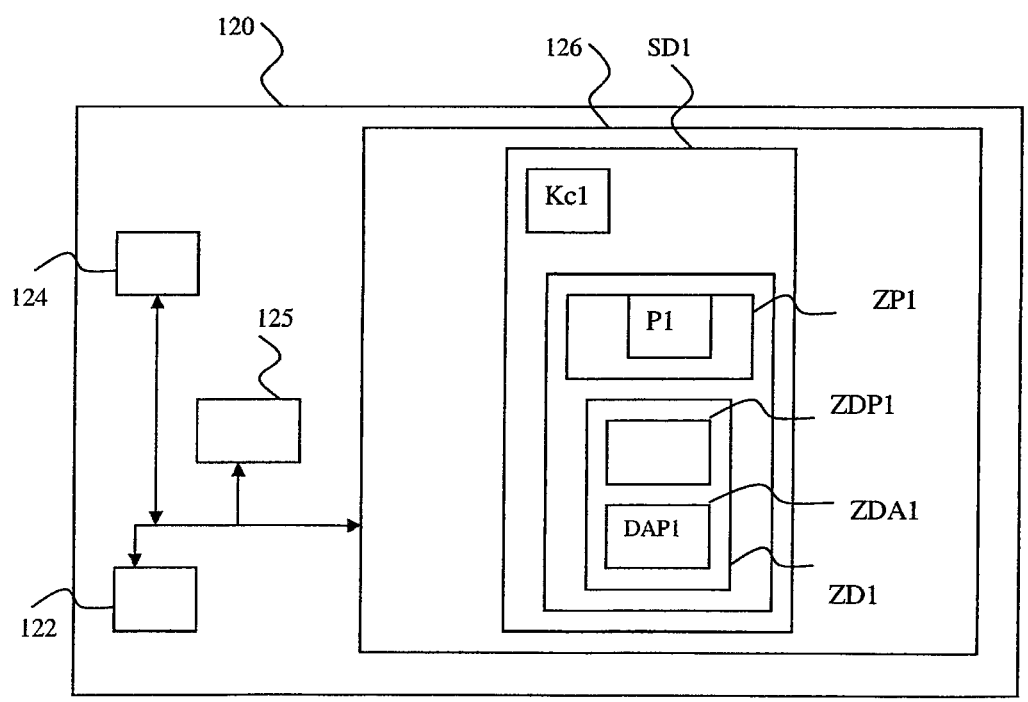
FIG. 4 is a block diagram illustrating a first security module capable of transmitting or storing secure data, used in a transfer system according to the invention.
Figure 5:
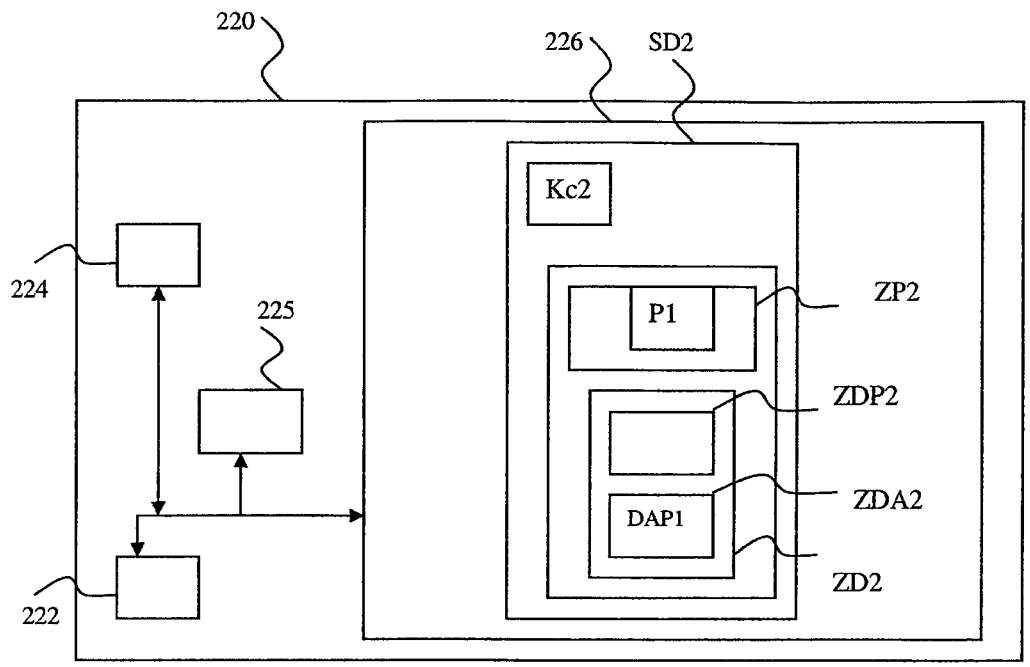
FIG. 5 is a block diagram illustrating a second security module capable of receiving the secure data originating from the first security module, used in a transfer system according to the invention.

Referring to FIG. 4, an embodiment of the security module 120, which is a security module capable of transmitting secure data, will now be described.

The security module 120 comprises in particular a microprocessor 122, a transmission/reception module 124, one or more RAM-type memories 125 and one or more ROM- or EEPROM-type memories 126 in which are stored programs that can be executed by the microprocessor 122.

In accordance with the GlobalPlatform specifications, a security domain SD1 has been defined in the security module 120. This security domain is a memory area 126 of the security module that is protected by a key K1$c$ shared with the management server T1. The key K1$c$ is, for example, a key, called diversified key, determined by the management server T1 from a master key K1 known only to the management server T1.

Alternatively, the security module 120 may contain a number of security domains, each domain being protected by a key transmitted by a management server.

An application, for example a payment application AP1, has been installed by the first management server T1 on the first security module 120, associated with the mobile terminal 100.

The downloading of this application conventionally comprises three phases: the downloading of the application program P1, instantiation and customization.

The downloading of the program P1 of the application AP1 is performed either into an area ZP1 of the security domain SD1, or into a memory area of the security module that is common to all the security domains of the security module 120.

The instantiation of the application AP1 in the security domain SD1 entails reserving a memory area ZD1 for the application AP1 in the security domain SD1 and writing the data in this reserved area. More specifically, the area ZD1 contains an area ZDP1 for data associated with the program P1 and an area ZDA1 for application data DAP1 of the application AP1. The data associated with the program P1 are written upon instantiation in the area ZDP1.

The application data area ZDA1 contains data updated during the life of the application. These data represent, for example, the configuration choices for the application made by the user or the list of transactions carried out. The application data area ZDA1 may also contain application keys, that is to say keys necessary to the operation of the application. The application data are initialized in the security module, in the customization phase.

The area ZD1 cannot be accessed in read mode by the use of a conventional data read instruction because it is confidential. Only the program P1 of the application AP1 has access to this area for its own requirements.

The user now wants this application AP1 to be transferred to the second security module 220. He wants in particular the area ZDA1 of application data of the application AP1 to be transferred so as to retrieve his configuration choices when using the application AP1 from a terminal associated with the second security module 220.

One embodiment of a second security module 220, which is a security module capable of receiving the secure data originating from a first security module, will now be described with reference to FIG. 5.

The security module 220 comprises in particular a microprocessor 222, a transmission/reception module 224, one or more RAM-type memories 225 and one or more ROM- or EEPROM-type memories 226 in which are stored programs that can be executed by the microprocessor 222.

The second security module 220 contains a security domain SD2, conforming to the GlobalPlatform specifications. This security domain is a memory area 226 of the security module 220. This security domain SD2 contains an encryption key K2c shared with the second management server T2. The key K2c is, for example, a key determined by the management server T2 based on a master key K2 known only to the management server T2.

In a preliminary step, the application AP1 has been downloaded into the security module SD2. More specifically, the program P1 of the application AP1 has been downloaded into an area ZP2 of the security module SD2 and a data area ZD2 has been reserved in the security domain SD2. Furthermore, the area ZDP1 for data linked to the application AP1 has been downloaded into an area ZDP2 of the area ZD2.

Figure 6:
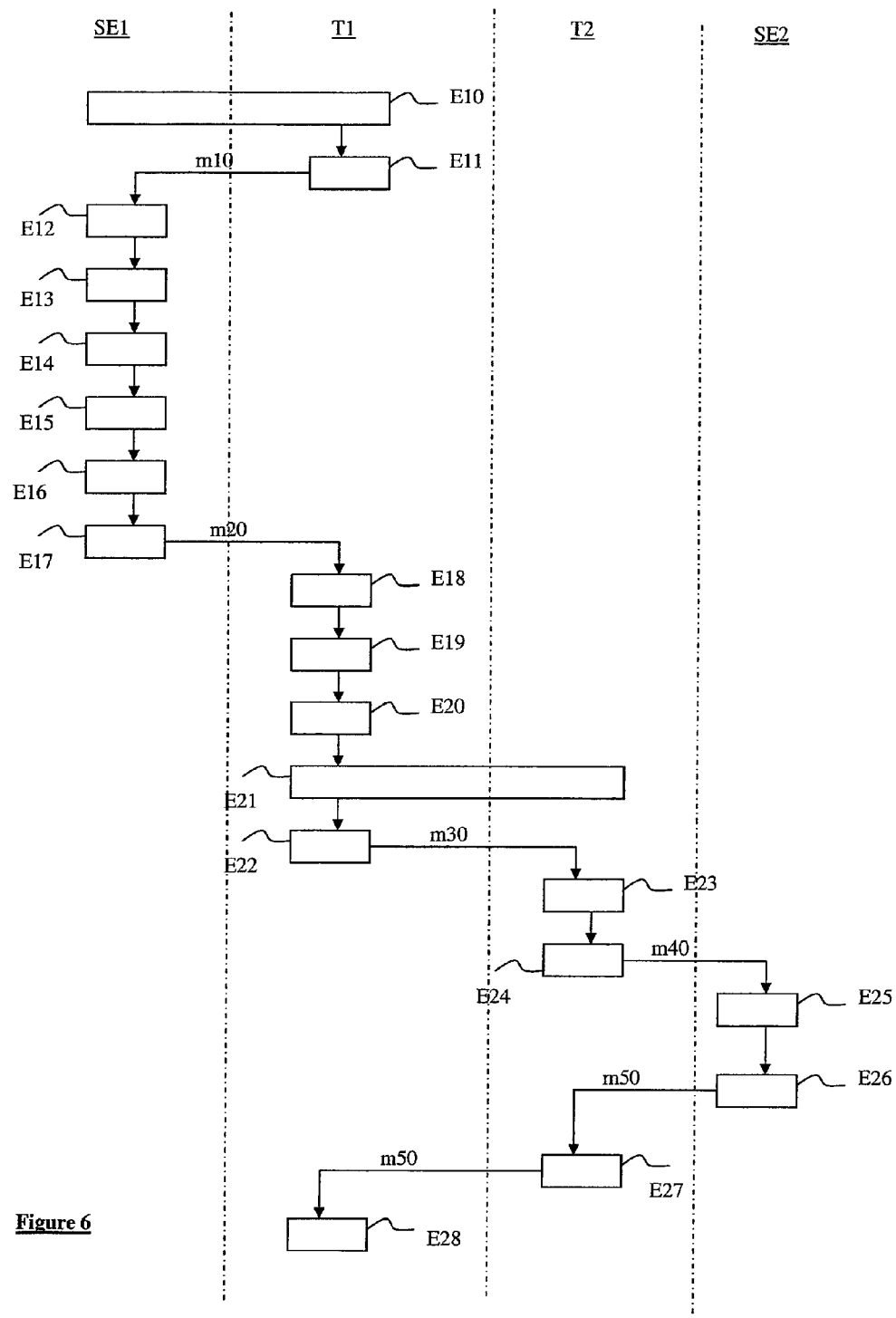
FIG. 6 is a flow diagram illustrating the steps of a data transfer method and of a method for accessing secure data implemented in a transfer system according to one embodiment of the invention.

The various steps of one embodiment of a data transfer method and of a method for accessing these data will now be described with reference to FIG. 6.

In a first step E10, the first management server T1 sets up a secure communication channel with the security domain SD1. Setting up such a channel entails, for the first management server T1, selecting the security domain by using an identifier of this security domain.

After this channel has been set up, the management server T1 transmits to the first security module 120, in a step E11, a message m10 containing a request to access DA the application data DAP1 of the application AP1, stored in the security domain SD1. More specifically, the access request DA is a new command whose format conforms to the GlobalPlatform specifications. This command defines, on one or more octets, the action to be performed by the security module 120.

In the embodiment described, the access request DA is in the form of a conventional standardized APDU (Application Protocol Data Unit) command: CLA-INS-P1-P2-Lc-Data-Le. The general meanings of each parameter CLA, INS, P1, P2, Lc, Data and Le are defined in the ISO 7816-4 specifications.

More specifically, for this new command DA, the parameter INS is, for example, a value indicating that the instruction to be carried out by the security module is a secure read instruction, the parameters P1 and P2 are, for example, parameters specifying options of the INS instruction, for example read with or without blocking the application, read with or without deleting data, and so on, and the parameter Data contains, for example, an identifier of the application AP1.

The message m10 contains an identifier of the security domain SD1 and the access request DA encrypted by the first server T1 with the first encryption key K1c.

Alternatively, only a portion of the access request DA is encrypted.

This message m10 is received by the first security module 120 in a step E12.

In the next step E13, the first security module decrypts the message m10 by using the encryption key K1c and obtains the access request DA.

The decryption enables the security module to authenticate the server sending the request.

In the next step E14, the security module 120 analyzes this access request and determines that this request is a secure read instruction, by reading the value of the INS parameter. It also determines that the requested area is the area for application data of the application AP1 in the domain SD1 by reading the Data area contained in the command DA.

The step E14 is followed by a step E15 in which the first security module 120 recovers these data by reading the area ZDA1 for application data DAP1 of the application AP1 stored in the security domain SD1. The area ZDA1 represents a first secure memory area.

In the next step E16, the first security module 120 encrypts the data read in the step E15, with the key K1c, and transmits, in a step E17, a message m20 containing the encrypted data obtained, to the first management server T1, via the first mobile terminal 100 and the communication network R.

The management server T1 receives the message m20 in a step E18 and, using the key K1c, decrypts this content and thus obtains the content DAP1 of the application data area ZDA1 of the application AP1 stored in the security domain SD1 (step E19).

The step E19 is followed by a step E20 in which the security module orders the blocking of the application AP1. For this, it modifies a GlobalPlatform register of the security module (transition to the "locked" state). Thus, the application AP1 no longer responds to the selection requests originating from external equipment items.

Modifying this register corresponds to executing a conventional Set Status command defined in the GlobalPlatform specifications and transmitted via a management server.

Alternatively, the step E20 is not a step for blocking the application but a step for deleting application data. For example, all the data of the area ZD1 and/or of the area ZP1 are set to the value 0, thus preventing any execution of the application AP1.

Alternatively again, no action is performed in the step E20.

In the embodiment described here, the action to be carried out in the step E20 is determined by the content of the parameters P1 and/or P2 of the access request DA.

For example, the parameter P1 is an octet in the form 'b8 b7 b6 b5 b4 b3 b2 b1' in which the bit b5=1 indicates that the action to be carried out is a deleting of the data and the bit b6=1 indicates that the security module must order the blocking of the application.

In a variant of the embodiment, following the transfer of the data to the first management server T1 (step E17), the security module 120 transmits an information item to a server SP, which is, for example, a server of the operator or of the sender of the security module, to inform it of the transfer of application data so that the latter can keep a history of the transfers carried out so as to ensure service in the event of conflict and thus increase the security of the system.

The step E20 is followed by a step E21 in which the first management server T1 then sets up a secure channel with the second management server T2. This channel can be set up conventionally by the exchange of keys shared between the two servers.

After this secure channel has been set up, the first server T1 transmits, to the second management server T2, an encrypted message m30 containing the application data DAP1 of the application AP1, in a step E22.

In the next step E23, the second management server T2 receives these data and prepares a command to customize the application AP1 in the security domain SD2.

In the embodiment described here, this request consists of an "Install for perso" instruction and one or more "Store Data" instructions containing the application data DAP1 of the application AP1 transmitted by the server T1. The "Install for perso" and "Store Data" instructions are defined in the GlobalPlatform specifications.

Alternatively, the application data are also encrypted with the key Kc2.

These instructions are then transmitted encrypted with the management key Kc2 from the security domain SD2 in a number of messages m40 to the second security module 220, in a step E24.

In the next step E25, the second security module 220, after receiving these instructions, decrypts them and orders the writing of the application data DAP1 of the application AP1 in the area ZD2 reserved for the application AP1 in the security domain SD2 of the second security module. More specifically, these data are stored in the area ZDA2 for application data of the application AP1 of the security domain SD2.

In the next step E26, the second security module 220 returns an acknowledgement message m50 to the second management server T2. In the embodiment described, this message is an acknowledgement instruction (Proof of Receipt) compliant with the GlobalPlatform standard.

The second management server T2 transmits this notification message m50 to the first server T1 in a step E27.

In an embodiment in which no action has been performed in the step E20, the first server T1 may then, in a step E28, order the first security module 120 to carry out a blocking and/or data deleting action, following the receipt of the message m50. For this, it transmits to the security module 120 a conventional blocking command (Set Status command specified in GlobalPlatform) of the application AP1 and/or a conventional command (Delete command specified in GlobalPlatform) to delete application data linked to the application contained in the security domain SD1 of the security module 120 and/or an instruction to delete the data area ZD1 and the program area ZP1 of the application AP1.

Thus, the user of the first security module can no longer use the application AP1 from this first security module.

The first server T1 can also send an information message to the service provider, for example the bank, to inform it that the application AP1 is no longer accessible in the first security module 120.

In the embodiment described, the downloading of the application AP1 into the security domain SD2 of the security module 220 is performed before the recovery of the data in the first security module 120. Alternatively, this downloading may be performed just before the transmission of the application data to the security module 220, that is to say after the step E21.

In the embodiment described, the application data of an application are transferred from a first management server T1 to a second management server T2. The invention also applies to the case where one and the same management server manages both security modules 120 and 220. In this case, the step E21 for setting up a secure channel and the step E22 for transferring from a first server to the second server are not carried out.

The invention also relates to the case where the user has a single mobile terminal and two security modules. The user must then insert the first security module into the terminal for the data reading phase. He must then replace this first module in the mobile terminal with the second module. Finally, if the application blocking step has not been carried out in the reading phase, he must once again reinsert the first module.

An embodiment of a data transfer request method and of the method for accessing these data will now be described.

Figure 7:
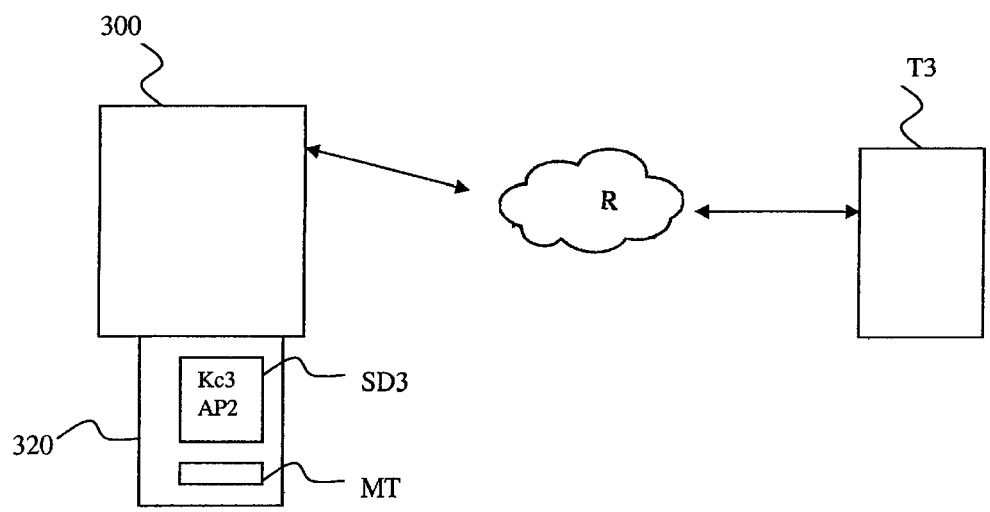
FIG. 7 is a diagram illustrating a data transfer request method and a data access method implemented when updating an application, according to one embodiment of the invention.

Referring to FIG. 7, a user has a mobile terminal 300 associated with a security module 320.

The mobile terminal 300 also has a communication module 330, enabling communication, via a communication network R, with remote servers, for example with a management server T3.

The security module 320 is a memory card compatible with the GlobalPlatform specifications. This security module is similar to the security module 120, described previously with reference to FIG. 4.

A security domain SD3 has been defined in this security module. An encryption key Kc3 has been defined and stored for this security domain SD3 in the security module 320 by the management server T3.

An application AP2 has been installed in this security module. More specifically, the program P3 of the application AP2 is stored in an area ZP3 of the security domain SD3 and an area ZD3 of the security domain SD3 is reserved for this application. The application data DAP3 linked to the application AP2 have been stored in an area ZDA3 of the area ZD3. The area ZDA3 represents a first secure memory area.

The service provider associated with the application AP2 wants to perform an update of the application AP2 and transmits to the management server T3 a new program P4 of the application AP2.

The management server T3 then transmits to the security module 320 a request to access the application data of the application AP2 stored in the security domain SD3. This access request is encrypted with the key Kc3.

This access request contains an information item, which represents an action instruction, indicating to the security module that the application data must be stored temporarily in a second memory area of the security module, by the security module.

In the embodiment described here, the transfer request is a new command whose format conforms to the GlobalPlatform specifications. This command defines, on one or more octets, the action to be carried out by the security module 320.

The transfer request is in the form: CLA-INS-P1-P2-Lc-Data-Le, with:

INS a parameter indicating that the instruction to be carried out by the security module is a transfer instruction, P1 and P2 are parameters specifying options for the instruction INS, for example P1 and/or P2 indicate that the data must be transferred from an application to a temporary memory.

Data contains an identifier of the application AP2.

The security module receives this message and decrypts it. It then accesses the requested application data by reading the area ZDA3, encrypts the data read with the key Kc3 and stores the data read and encrypted in a temporary memory MT of the security module. The area MT is a second memory area of the security module 320.

The security module 320 then transmits an acknowledgement message to the management server T3.

The management server T3 then orders the installation of the new version of the application in the security domain SD3 of the security module 320. This installation entails loading the new version P4 of the program of the application, instantiating it and activating it.

In the embodiment described, these actions correspond to the commands "Install For Load", "Load", "Install for Install" and "Install for Make Selectable" specified in GlobalPlatform.

The transmission of this new program results, in a known manner, in the deletion of the areas ZP3 and ZD3 in the security domain SD3 and the creation of new areas ZP4 and ZD4 in the security domain SD3, equivalent to the areas ZP3 and ZD3.

In a particular embodiment, the areas ZP3 and ZP4, on the one hand, and the areas ZD3 and ZD4, on the other hand, are the same areas. In this case, the first secure memory area and the third secure memory area are the same.

The new program P4 is stored in the area ZP4.

Following the installation of this new version P4, the security module sends an acknowledgement message to the management server T3.

The management server T3 then transmits to the security module 320 a message containing a request to transfer application data from the second memory area to the area ZDA4 for application data ZDA4 of the application AP2 in the security domain SD3. The area ZDA4 is included in the area ZD4 and represents a third secure memory area.

In the embodiment described here, the transfer request is a new command whose format conforms to the GlobalPlatform specifications. This command defines, on one or more octets, the action to be carried out by the security module 320.

The transfer request is in the form: CLA-INS-P1-P2-Lc-Data-Le, with:

INS a parameter indicating that the instruction to be carried out by the security module is a transfer instruction, P1 and P2 are parameters specifying options for the instruction INS, for example P1 and/or P2 indicate that the data must be transferred from a temporary memory to an application.

Data contains an identifier of the application AP2.

Alternatively, the request to transfer data from the second area MT to the application data area of the application AP2, that is to say the third secure memory area, is an "Install for Perso" instruction specified in the GlobalPlatform specifications in which a parameter, for example P1 or P2, is modified to indicate that the application data to be transferred are stored in a second memory area of the secure module.

Following the receipt of this command, the security module decrypts, with the key Kc3, the data stored in the second memory area MT and writes them into the area ZDA4 reserved for the application data of the application AP2 in the security domain SD3 of the security module 320.

Thus, the security module SD3 carries out the steps for receiving a message containing a request to access application data of the application AP2, stored in a first secure area of the security module, the message being encrypted with a first management key, obtaining the access request by decrypting the message by means of a second management key associated with the first management key, reading the application data of the application AP2, encrypting the data read and storing the data read and encrypted in a second memory area of the security module.

The management server T3 carries out the steps for transmitting a message containing a request to transfer into a second memory area of the security module application data of the application AP2, stored in a first secure area of the security module, the message being encrypted with a first management key, transmitting an update of the application AP2 into a third secure memory area and transmitting a request to transfer data stored in the second memory area to the third secure memory area.

In a variant of this embodiment, the data read in the first secure memory area of the security domain of the mobile terminal are transmitted to the management server which stores them and transfers them once again to the security module when the application has been updated.

In another variant of this embodiment, the new version P4 of the program is installed in new areas ZP4 and ZD4 of the security domain SD3 while the version P3 of the application AP2 is still active in the areas ZP3 and ZD3. The transfer of the application data from the area ZD3 to the area ZD4 is then carried out by a single transfer request. This transfer request is an instruction to transfer from a first secure memory area to a third secure memory area. It contains an identifier of the first memory area and an identifier of the third memory area. In this variant, the data read in the area ZD3 are rewritten directly into the area ZD4.

According to an embodiment chosen and represented in FIG. 7, a management server implementing an access method according to the invention is, for example, a microcomputer 500 which comprises, in a known manner, in particular a processing unit 502 equipped with a microprocessor, a read-only memory of ROM or EEPROM type 503, a random access memory of RAM type 504 and a communication interface 505 with a network R.

The microcomputer 500 may conventionally and non-exhaustively include the following elements: a keyboard, a screen, a microphone, a loudspeaker, a disk drive, a storage means, and so on.

This server 500 comprises a module ME1 for transmitting data to a communication network, a module MR1 for receiving data from the communication network, a module MC1 for constructing messages and an encryption and decryption module MD1.

A first management key is stored in the read-only memory 503.

The message construction module MC1 is able to prepare a message containing a request to access secure data of a security module. The encryption/decryption module MD1 is able to encrypt at least a part of the message prepared by the module MC1, with the first management key stored in the read-only memory 503.

The transmission module ME1 is able to transmit the prepared and encrypted message.

The reception module MR1 is able to receive data encrypted with a second management key associated with the first management key and to transmit them to the encryption/decryption module MD1.

The encryption/decryption module MD1 is able to decrypt the encrypted data received by means of the first management key and to thus obtain the requested data.

The encryption/decryption module MD1 is also able to encrypt these data with a key shared with a second entity, for example a second server or a second security module, and the transmission module ME1 is able to transmit these encrypted data to the second server or to the second security module.

The read-only memory 503 comprises registers storing a computer program PG1 comprising program instructions suitable for implementing an access method according to the invention as described previously.

This program PG1 is thus suitable for transmitting a message containing a request to access secure data of the security module, at least a portion of said message being encrypted with a first management key, for receiving data encrypted with a second management key associated with the first key and for obtaining the requested data by decryption using the first key.

The data obtained are either stored in a temporary memory, or transferred securely, via the network R, to another security module.

During power-up, the program PG1 stored in the read-only memory 503 is transferred into the random access memory which then contains the executable code of the display method of the invention and registers for storing the variables necessary for implementing the invention.

More generally, a storage means, that can be read by a computer or by a microprocessor, incorporated or not in the device, possibly removable, stores a program implementing the data access method according to the invention.

Figure 8:
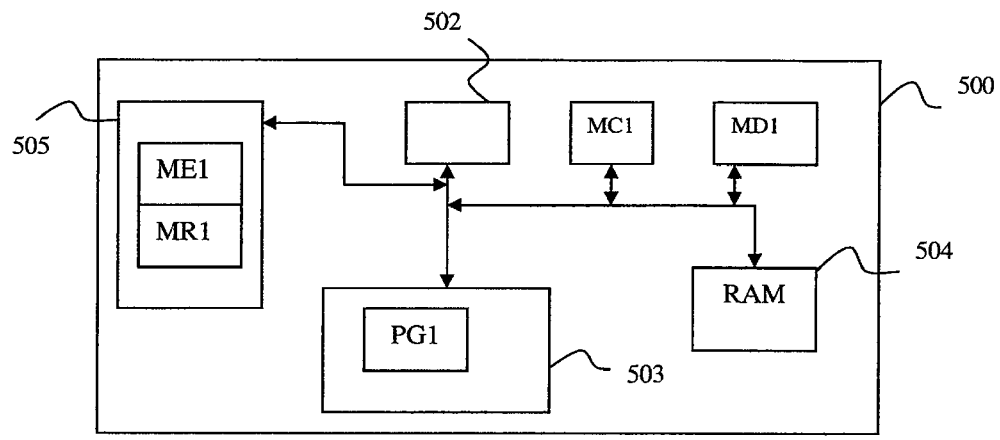
FIG. 8 is a block diagram representing a management server capable of performing the steps of an access method according to one embodiment of the invention.
Figure 9:
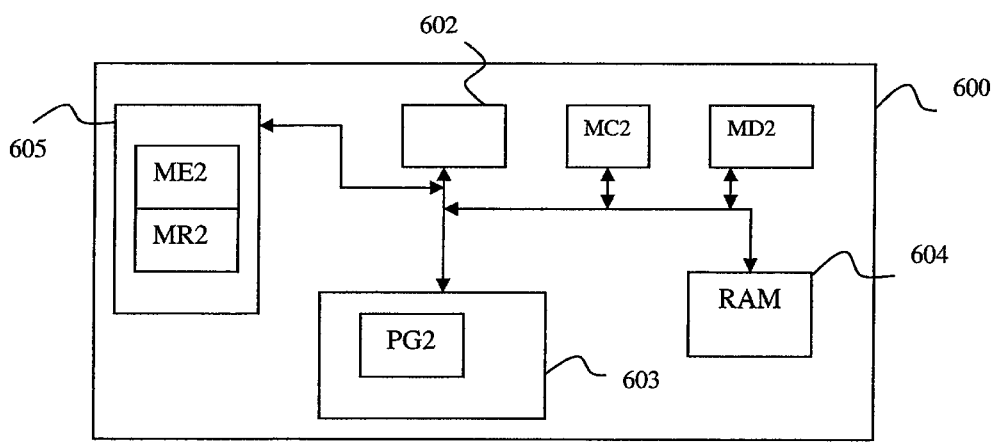
FIG. 9 is a block diagram representing a management server capable of performing the steps of a transfer request method according to one embodiment of the invention.

According to an embodiment chosen and represented in FIG. 8, a management server implementing a transfer request method according to the invention is, for example, a PC-type computer 600 which comprises, in a known manner, in particular a processing unit 602 equipped with a microprocessor, a read-only memory of ROM type 603, a random access memory of RAM type 604. The terminal 600 may conventionally and non-exhaustively include the following elements: a keyboard, a screen, a microphone, a loudspeaker, a communication interface, a disk drive, a storage means, and so on.

This server comprises a module ME2 for transmitting data to a communication network, a module MR2 for receiving data from the communication network, a module MC2 for constructing messages and an encryption and decryption module MD2.

A first management key is stored in the memory 603.

The message construction module MC2 is able to prepare a message containing a request to transfer data linked to an application, stored in a first secure memory area of a security module, into a second memory area of the security module.

The encryption/decryption module MD2 is able to encrypt at least a portion of the message prepared by the module MC2, with the first management key stored in the read-only memory 603.

The transmission module ME2 is able to transmit the prepared and encrypted message.

The transmission module ME2 is also able to transmit an update of an application into a third secure memory area and a request to transfer secure data from the second memory area to the third secure memory area.

The read-only memory 603 comprises registers storing a computer program PG2 comprising program instructions suitable for implementing a transfer request method according to the invention as described previously.

This program PG2 is thus suitable for transmitting a message containing a request to access secure data of the security module, at least a portion of said message being encrypted with a first management key, for transmitting an update of the application into a third secure memory area and for transmitting a request to transfer data from the second memory area to the third secure memory area.

During power-up, the program PG2 stored in the read-only memory 603 is transferred into the random access memory which will then contain the executable code of the invention and registers for storing the variables necessary to the implementation of the invention.

More generally, a storage means, that can be read by a computer or by a microprocessor, integrated or not in the device, possibly removable, stores a program implementing the data transfer request method according to the invention.

The invention claimed is:

1. A method for transferring data from a first secure memory area to a second secure memory area, the data being linked to an application installed on a security module associated with a mobile terminal, the data being stored in the first secure memory area of the security module, the method comprising steps for:
    receiving a message containing a request to access said data of said application and to prevent execution of said application, at least a portion of said message being encrypted with a first management key,
    obtaining said request by decrypting the message by way of a second management key associated with the first management key,
    reading said application data,
    encrypting the data read, utilizing a processor of the security module, with the second management key, and
    transmitting the encrypted data or storing the encrypted data in the second secure memory area;
    wherein the application is prevented from execution based on the request after transmitting or storing the encrypted data; and
    wherein the method is performed by one or more hardware processors.

2. The transfer method as claimed in claim 1, wherein the second memory area is located in the security module.

3. The transfer method as claimed in claim 2, wherein the access request comprises an action instruction and the method comprises a step for executing said action after the transmission or storage step.

4. The transfer method as claimed in claim 3, wherein the action is at least one of a blocking of said application and a deleting of data of said application.

5. The transfer method as claimed in claim 4, further comprising a step for receiving an instruction to update the application in a third secure memory area and a step for receiving an instruction to transfer said data from the second memory area to the third secure area.

6. The transfer method as claimed in claim 1, characterized in that the second memory area is located in an other security module.

7. The transfer method as claimed in claim 6, wherein the access request comprises an action instruction and the method comprises a step for executing the action after the transmission or storage step.

8. A security module associated with a mobile terminal, the module comprising:
    a receiver that comprises a hardware processor and associated receiving algorithm that receive a message containing a request to access data linked to an application installed on the security module and to prevent execution of the application, the data being stored in a first secure memory area of the security module, said message being encrypted with a first management key,
    an obtaining algorithm that obtains said request by decryption of the message by way of a second management key associated with the first management key,
    a reading algorithm that reads said data,
    an encrypting algorithm that encrypts the data read with the second management key,
    a storing algorithm, that stores the encrypted data in a second memory area able to store the encrypted data, or a transmitter, that transmits the encrypted data; and a blocking algorithm that prevents the execution of the application based on the request.

9. A non-transitory computer program product comprising instructions for implementing a method for transferring data from a first secure memory area to a second secure memory area, the data being linked to an application installed on a security module associated with a mobile terminal, the data being stored in the first secure memory area of the security module, when the method is loaded and run by a hardware processor, the method comprising steps for:
receiving a message containing a request to access said data of said application and to prevent execution of said application, at least a portion of said message being encrypted with a first management key,
obtaining said request by decrypting the message by way of a second management key associated with the first management key,
reading said application data,
encrypting the data read, utilizing a processor of the security module, with the second management key, and
transmitting the encrypted data or storing the encrypted data in the second secure memory area;
wherein the application is prevented from execution based on the request after transmitting or storing the encrypted data.

10. The non-transitory computer program product of claim 9, wherein the second memory area is located in the security module.

11. The non-transitory computer program product of claim 9, characterized in that the second memory area is located in an other security module.

12. The non-transitory computer program product of claim 10, wherein the access request comprises an action instruction, the method further comprising executing said action after the transmission or storage step.

13. The non-transitory computer program product of claim 9, wherein the action is at least one of a blocking of said application and a deleting of data of said application.

14. The non-transitory computer program product of claim 13, the method further comprising receiving an instruction to update the application in a third secure memory area and a step for receiving an instruction to transfer said data from the second memory area to the third secure area.

15. A terminal comprising:
a security module comprising:
a receiver that comprises a hardware processor and associated receiving algorithm that receive a message containing a request to access data linked to an application installed on the security module and to prevent execution of the application, the data being stored in a first secure memory area of the security module, said message being encrypted with a first management key,
an obtaining algorithm that obtains said request by decryption of the message by way of a second management key associated with the first management key,
a reading algorithm that reads said data,
an encrypting algorithm that encrypts the data read with the second management key,
a storing algorithm, that stores the encrypted data in a second memory area able to store the encrypted data, or a transmitter, that transmits the encrypted data; and
a blocking algorithm that prevents the execution of the application based on the request.

* * * * *